(12) United States Patent
Nuthakki et al.

(10) Patent No.: US 11,720,254 B2
(45) Date of Patent: Aug. 8, 2023

(54) MANAGING I/O CONNECTIONS USING VIRTUAL HOST PORTS

(71) Applicant: EMC IP Holding Company LLC, Hopkinton, MA (US)

(72) Inventors: Krishna Deepak Nuthakki, Bangalore (IN); Arieh Don, Newton, MA (US); Erik P. Smith, Douglas, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 78 days.

(21) Appl. No.: 17/085,275

(22) Filed: Oct. 30, 2020

(65) Prior Publication Data

US 2022/0137824 A1    May 5, 2022

(51) Int. Cl.
    *G06F 3/06*    (2006.01)

(52) U.S. Cl.
    CPC ............ *G06F 3/0613* (2013.01); *G06F 3/067* (2013.01); *G06F 3/0619* (2013.01); *G06F 3/0653* (2013.01); *G06F 3/0659* (2013.01); *G06F 3/0664* (2013.01)

(58) Field of Classification Search
    CPC .... G06F 3/0613; G06F 3/0619; G06F 3/0653; G06F 3/0659; G06F 3/0664; G06F 3/067
    See application file for complete search history.

(56) References Cited

U.S. PATENT DOCUMENTS

| | | | |
|---|---|---|---|
| 6,445,682 B1 | 9/2002 | Weitz | |
| 6,593,878 B2 | 7/2003 | Fall | |
| 7,307,998 B1 | 12/2007 | Wang et al. | |
| 7,362,717 B1 * | 4/2008 | Betker | H04L 29/12886 370/254 |
| 9,143,841 B2 * | 9/2015 | Chamdani | H04Q 3/0045 |
| 10,425,344 B2 * | 9/2019 | Ma | H04L 5/0055 |
| 10,645,437 B2 * | 5/2020 | Ramaraj | H04N 21/2662 |
| 10,929,316 B2 * | 2/2021 | Rowlands | G06F 13/4022 |
| 11,032,373 B1 * | 6/2021 | Mallick | H04L 61/6022 |
| 11,237,997 B2 * | 2/2022 | Smith | G06F 13/4027 |
| 2001/0032269 A1 * | 10/2001 | Wilson | H04L 69/16 709/238 |
| 2002/0135794 A1 * | 9/2002 | Rodriguez | H04N 1/00148 358/1.15 |
| 2003/0177290 A1 | 9/2003 | Ayukawa et al. | |
| 2006/0037075 A1 * | 2/2006 | Frattura | H04L 63/1416 709/224 |

(Continued)

*Primary Examiner* — Arpan P. Savla
*Assistant Examiner* — Eric T Loonan
(74) *Attorney, Agent, or Firm* — Muirhead and Saturnelli, LLC

(57) ABSTRACT

Bandwidth consumption and/or an I/O transmission rate on an I/O path between a port of a storage system and a physical host port may be managed, including determining when multiple virtual host ports correspond to (i.e., are mapped to) a same physical host port. This virtual host port mapping information may be used to more accurately determine bandwidth consumption and I/O transmission rates on I/O connections along an I/O path including the physical host port, and to adjust the bandwidth consumption and/or I/O transmission rate on one more of these I/O connections according to bandwidth thresholds and I/O count thresholds defined for the I/O path (e.g., for the Physical host port of the I/O path).

20 Claims, 9 Drawing Sheets

(56) References Cited

U.S. PATENT DOCUMENTS

| | | | |
|---|---|---|---|
| 2007/0083625 A1* | 4/2007 | Chamdani | H04Q 3/66 709/223 |
| 2008/0175160 A1* | 7/2008 | Cometto | H04L 47/20 370/468 |
| 2008/0228972 A1 | 9/2008 | Pickett | |
| 2012/0084071 A1 | 4/2012 | Cyr et al. | |
| 2013/0212345 A1 | 8/2013 | Nakajima | |
| 2014/0032781 A1* | 1/2014 | Casey | H04N 21/2662 709/233 |
| 2017/0039079 A1* | 2/2017 | Nambiar | G06F 9/45558 |
| 2017/0171091 A1* | 6/2017 | Nayak | H04L 47/25 |
| 2019/0303281 A1* | 10/2019 | Firoozshahian | G06F 11/348 |
| 2020/0133895 A1* | 4/2020 | Crowley | G06F 13/1605 |
| 2020/0136897 A1 | 4/2020 | Smith et al. | |
| 2020/0145282 A1 | 5/2020 | Copley et al. | |
| 2020/0320025 A1 | 10/2020 | Rowlands et al. | |

* cited by examiner

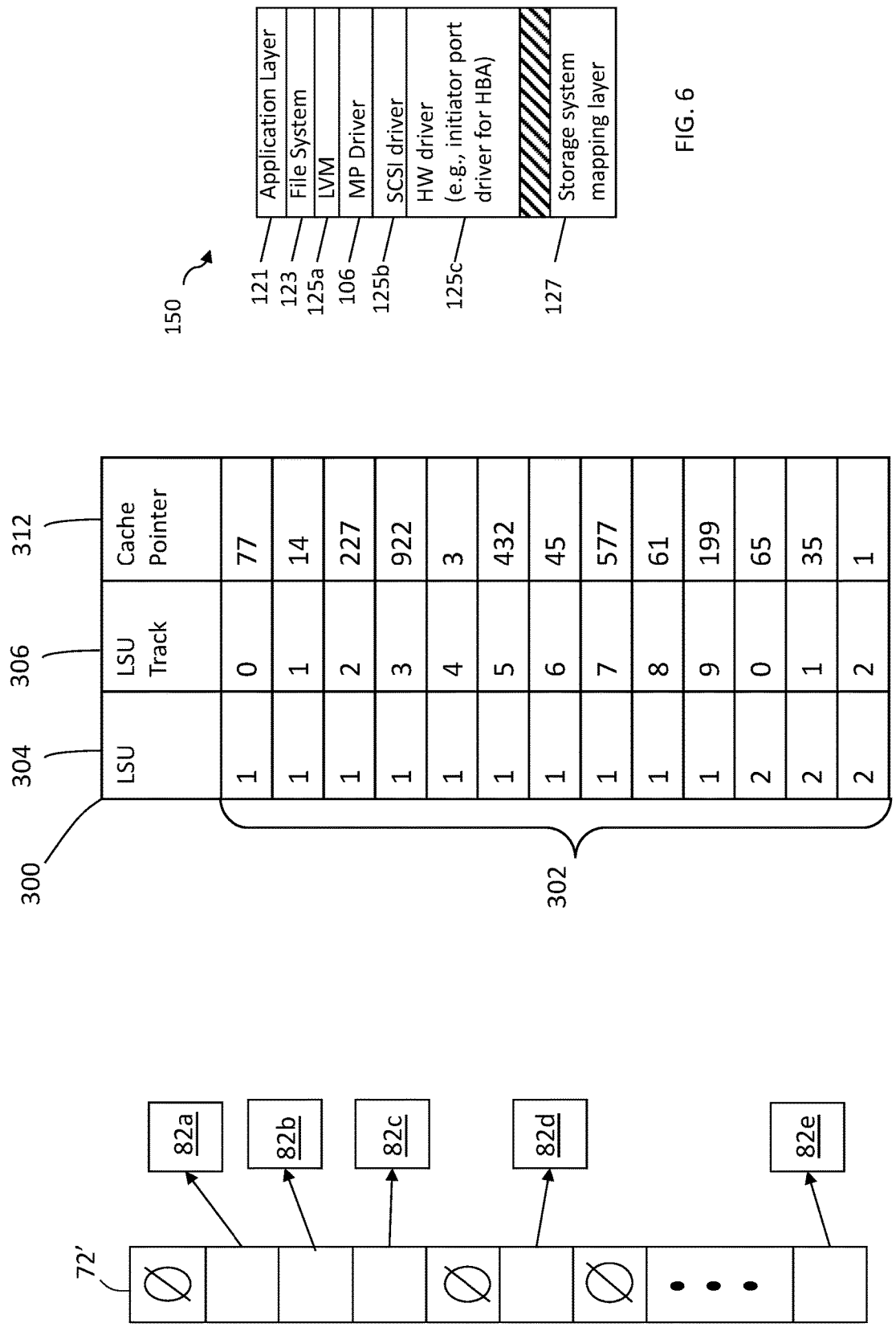

FIG. 8

| 802 | 804 | 806 | 808 |
|---|---|---|---|
| LSU | Host Port | Front-End Port | Other Info |
| Dev0 | WWN12 | WWN45 | |
| Dev1 | WWN9 | WWN117 | |
| ... | | | |
| Devn | WWN77 | WWN6 | |

| 902 | 904 | 906 |
|---|---|---|
| Initiator Port | Target Port | Other Info |
| WWW1 | WWW3 | |
| WWW7 | WWW8 | |
| ... | | |
| WWW9 | WWW2 | |

| 1002 | 1004 | 1006 | 1008 | 1010 | 1012 | 1014 | 1016 | 1018 |
|---|---|---|---|---|---|---|---|---|
| PHP Group ID | BWT (Gbps) | ICT | Cum. bandwidth | Cum. ITR | IOC1 info | IOC2 Info | ... | IOCn Info |
| | 16 | | | | | | | |
| | 4 | | | | | | | |
| | 8 | | | | | | | |

(1000, 1001)

MANAGING I/O CONNECTIONS USING VIRTUAL HOST PORTS

BACKGROUND

Technical Field

This application generally relates to data storage systems, and more particularly to managing I/O bandwidth limits for I/O connections involving virtual host ports.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and storage device may be communicated may be considered an I/O path between the application and the storage device. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In some embodiments of the invention, a method is performed for a system including a host system including a first physical host port having a predefined bandwidth threshold and a storage system. The method includes: determining a plurality of virtual host ports that are associated with the first physical host port; for a first port of the storage system, determining one or more I/O connections between the host system and the storage system that include the first port and one of the plurality of virtual host ports; monitoring a cumulative bandwidth consumption rate on the one or more I/O connections; and, if the cumulative bandwidth consumption rate exceeds the predefined bandwidth threshold of the first physical host port, adjusting bandwidth consumption on one or more of the I/O connections. The system further may include a switch, and determining a plurality of virtual host ports that are associated with the first physical host port may include determining that respective host port IDs of the plurality virtual host ports correspond to a same port of the switch physically linked to the first physical host port. Determining a plurality of virtual host ports that are associated with the first physical host port may include: the storage system sending one or more queries to the switch, each of the one or more queries including an identifier of at least one of the plurality of virtual host ports; and the switch sending to the storage system one or more responses to the one or more queries, the one more responses including, for each of the at least one of the plurality of virtual host ports, an identifier of a same SHP physically linked to the first physical host port. Each of the one more queries may be a GFPN_ID query in accordance with a Fibre Channel protocol. The method further may include maintaining a data structure including a plurality of entries, each entry representing a physical host port having at least one I/O connection with the first port of the host system, where the data structure may include a first entry representing the first physical host port and specifying the one or more I/O connections. The first physical host port may have a predefined I/O count threshold, and the method further may include: monitoring a cumulative I/O transmission rate on the one or more I/O connections; and, if the cumulative I/O transmission rate exceeds the predefined ICT of the first physical host port, adjusting the I/O transmission rate on one or more of the I/O connections. Each virtual host port may be an NPIV initiator.

In other embodiments of the invention, a system includes: a host system including a first physical host port having a predefined bandwidth threshold; and a storage system including executable logic that implements a method. The method includes: determining a plurality of virtual host ports that are associated with the first physical host port; for a first port of the storage system, determining one or more I/O connections between the host system and the storage system that include the first port and one of the plurality of virtual host ports; monitoring a cumulative bandwidth consumption rate on the one or more I/O connections; and, if the cumulative bandwidth consumption rate exceeds the predefined BWT of the first physical host port, adjusting bandwidth consumption on one or more of the I/O connections. The system further may include a switch, and determining a plurality of virtual host ports that are associated with the first physical host port may include determining that respective host port IDs of the plurality virtual host ports correspond to a same port of the switch physically linked to the first physical host port. Determining a plurality of virtual host ports that are associated with the first physical host port may include: the storage system sending one or more queries to the switch, each of the one or more queries including an identifier of at least one of the plurality of virtual host ports; and the switch sending to the storage system one or more responses to the one or more queries, the one more responses including, for each of the at least one of the plurality of virtual host ports, an identifier of a same SHP physically linked to the first physical host port. Each of the one more queries may be a GFPN_ID query in accordance with a Fibre Channel protocol. The method further may include maintaining a data structure including a plurality of entries, each entry representing a physical host port having at least one I/O connection with the first port of the host system, and the data structure may include a first entry representing the first physical host port and specifying the one or more I/O connections. The first physical host port may have a predefined I/O count threshold, and the method further may include: monitoring a cumulative I/O transmission rate on the one or more I/O connections; and, if the cumulative I/O transmission rate exceeds the predefined ICT of the first physical host port, adjusting the I/O transmission rate on one or more of the I/O connections. Each virtual host port may be an NPIV initiator.

In other embodiments of the invention, a computer-readable medium is provided for a system including a host system including a first physical host port having a predefined bandwidth threshold and a storage system. The computer-readable media has software stored thereon including: executable code that determines a plurality of virtual host ports that are associated with the first physical host port; executable code that, for a first port of the storage system, determines one or more I/O connections between the host system and the storage system that include the first port and one of the plurality of virtual host ports; executable code that monitors a cumulative bandwidth consumption rate on the one or more I/O connections; and executable code that, if the cumulative bandwidth consumption rate exceeds the predefined BWT of the first physical host port, adjusts bandwidth consumption on one or more of the I/O connections. The system further may include a switch, and wherein determining a plurality of virtual host ports that are associated with the first physical host port may include determining that respective host port IDs of the plurality virtual host ports correspond to a same port of the switch physically linked to the first physical host port. Determining a plurality of virtual host ports that are associated with the first physical host port may include: the storage system sending one or more queries to the switch, each of the one or more queries including an identifier of at least one of the plurality of virtual host ports; and the switch sending to the storage system one or more responses to the one or more queries, the one more responses including, for each of the at least one of the plurality of virtual host ports, an identifier of a same SHP physically linked to the first physical host port. Each of the one more queries may be a GFPN_ID query in accordance with a Fibre Channel protocol. The software further may include executable code that maintains a data structure including a plurality of entries, each entry representing a physical host port having at least one I/O connection with the first port of the host system, and the data structure may include a first entry representing the first physical host port and specifying the one or more I/O connections. The first physical host port may have a predefined I/O count threshold, and the software further may include: executable code that monitors a cumulative I/O transmission rate on the one or more I/O connections; and executable code that, if the cumulative I/O transmission rate exceeds the predefined ICT of the first physical host port, adjusts the I/O transmission rate on one or more of the I/O connections.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 4 is a block diagram illustrating an example of a data structure for mapping logical storage unit tracks to cache slots, according to embodiments of the invention;

FIG. 6 is a block diagram illustrating an example of a plurality of logical layers of a combination of a host system and a data storage system for processing an I/O request, according to embodiments of the invention;

FIG. 8 is a block diagram illustrating an example of a data structure defining port connectivity permissions between a storage system and one or more host systems, according to embodiments of the invention;

FIG. 9 is a block diagram illustrating an example of a data structure defining port connectivity permissions for a switch, according to embodiments of the invention;

FIG. 10 is a block diagram illustrating an example of a data structure for maintaining information for physical host ports groups associated with a port of a storage system, according to embodiments of the invention.

DETAILED DESCRIPTION OF EMBODIMENTS

Figure 1:
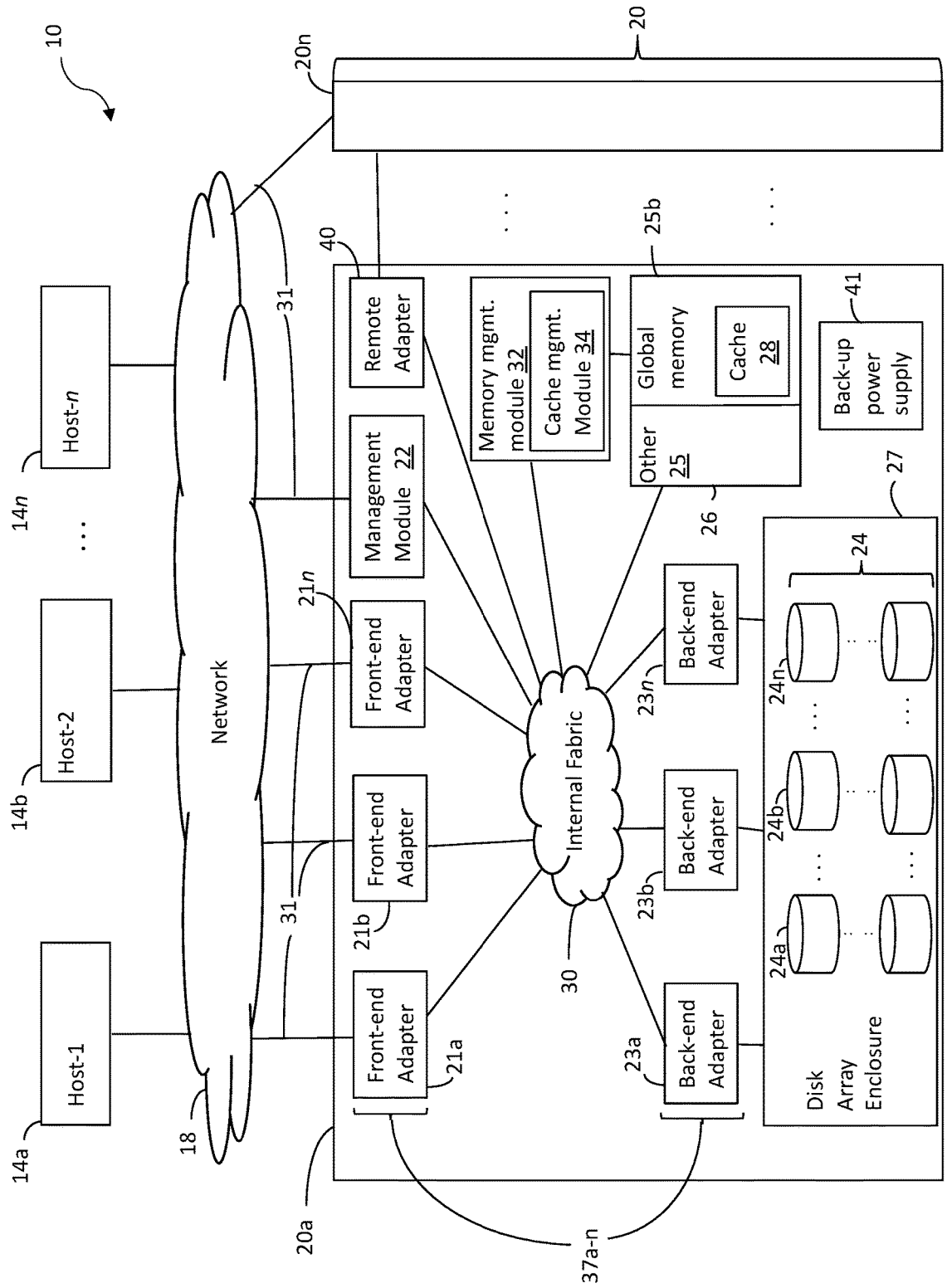
FIG. 1 is a block diagram illustrating an example of a data storage network, according to embodiments of the invention.

There may exist multiple I/O paths between a storage system and a host system across a switch that couples the storage system to the host system. Each I/O path may include an initiator and a target, where the initiator is a port of the host system, i.e., a host port, and each target is a port of a storage system, i.e., a storage system port, which may be referred to herein as a front-end port (FEP) as described in more detail elsewhere herein. Each host port (initiator) may be connected by a single physical link (e.g., an electrical or fiber optic cable) to a single dedicated port of the switch referred to herein as a switch host port (SHP) or fabric port, and each FEP (target) may be connected by a single physical link to a single dedicated port of the switch referred to herein as a switch storage port (SSP), as described in more detail herein. While a switch includes many possible physical paths between an SHP and SSP, a zoning table (described in more detail elsewhere herein) or the like may define the permissible or zoned paths between SHPs and SSPs of the switch. As each SHP is dedicated to a host port (initiator) and each SSP is dedicated to an FEP (target), a zone path may be defined in terms of an initiator-target (I-T) pair.

Configuring a storage network may include, for example, connecting host ports to SHPs and FEPs to SSPs, defining zones, provisioning storage, masking LSUs to FEPs and host ports (as described in more detail elsewhere herein), etc. During the configuration process, or in response to new components being added to the storage network, or during recovering from a failure, hosts and storage systems may separately log into switches. During the log-in process between the host and the switch, for each host port of a host that is physically connected to an SHP, the host may negotiate a maximum bandwidth threshold (BWT; i.e., the maximum throughput) for the physical link (hereinafter "link") between the host port and the SHP (i.e., fabric port) to which the host port is connected by the link. Also, during the log-in process between the storage system and the switch, independent of the log-in process between the host and the switch, for each FEP of a storage system physically connected to an SSP of the switch, the storage system may negotiate a BWT for the link between the FEP and the SSP to which the host port is connected by the link. For a given I/O path, as a result of the foregoing independent BWT negotiations, the negotiated BWT for the link between the host port and the SHP (i.e., the host port link) and the negotiated BWT for the link between the FEP and the SSP (i.e., the FEP link) may be different. The negotiated BWT for the host port link on an I/O path may be referred to herein as the "host port BWT", and the negotiated BWT for the FEP link on an I/O path may be referred to herein as the "FEP BWT".

A host port BWT being less than an FEP BWT on an I/O path may cause congestion on an I/O path. Further, this bandwidth mismatch may spread to cause congestion on other I/O paths. For example, if the FEP BWT is sending I/O onto the FEP link of the I/O path (e.g., in response to read operations) at a faster rate than the I/O can be transmitted to the host port on the host port link, the switch may use its credit buffers to queue I/O communications until enough bandwidth is available on the host port link to transmit the I/O data to the host port. For small differences between FEP BWT and host port BWT, use of the credit buffers may be sufficient to avoid unacceptably high response times. However, if the differences between FEP BWT and host port BWT are too big, use of credit buffers may be insufficient to avoid congestion. For example, the communications on the I/O path may consume so much of the credit buffer space that not enough credit buffer space is available to manage bandwidth on the I/O path, as well as on other I/O paths because there may not be enough remaining credit buffer space to adequately manage bandwidth the other I/O paths.

To prevent congestion spreading caused by a bandwidth mismatch on an I/O path, an FEP BWT for a specific I/O path may be defined to be the same as, or approximately the same as, the host port BWT on the I/O path. That is, the FEP BWT may be defined to be less that than the FEP BWT negotiated with the switch; i.e., to be less than a maximum capacity of the FEP link.

Further, the storage system may monitor I/O connections on the I/O path to prevent the host port BWT for the I/O path from being exceeded. For example, the cumulative bandwidth consumption of I/O connections on the I/O path may be monitored and the bandwidth consumption of one or more of the I/O connections reduced to keep the cumulative bandwidth consumption below the BWT of the host port, or return the cumulative bandwidth consumption below the BWT.

Some technologies allow multiple virtual host ports to exist for a single physical host port. For example, in accordance with Fibre Channel (FC) technology, N_Port ID Virtualization (NPIV) allows multiple Virtual_N ports to share a single physical host port, in which case each virtual port may have its own unique port ID (e.g., a unique Word Wide Names (WWNs)), even though multiple such unique IDs may correspond to a same physical port. Thus, multiple virtual host ports having different port IDs (e.g., per NPIV) may share a single physical host port. These virtual host ports are sometimes used to associate different virtual host ports with different host-related entities such as, for example, different virtual servers or applications running on a host.

A storage system may not be aware that two port IDs correspond to a same physical host port, but rather consider and treat the two port IDs as identifying two separate physical host ports. This misconception can lead to the inability of the storage system to properly assess the workload of a physical host port, including the bandwidth consumption and I/O transmission rate on the physical host port.

Thus, it would be desirable to be able to determine when multiple virtual hosts correspond to a same physical host port; i.e., when multiple host port IDs correspond to a same physical host port, to enable an accurate determination of bandwidth consumption and I/O transmission rate, for example, on the physical host port, for example, by a storage system.

Described herein are mechanisms and techniques for managing bandwidth consumption and/or an I/O transmission rate on an I/O path between an FEP and a physical host port (also referred to herein and in the figures as a "PHP"), including determining when multiple virtual host ports (also referred to herein and in the figures as "VHPs") correspond to (i.e., are mapped to) a same PHP. This virtual host port mapping information may be used to more accurately determine bandwidth consumption and I/O transmission rates on I/O connections along an I/O path including the physical host port, and to adjust the bandwidth consumption and/or I/O transmission rate on one or more of these I/O connections according to BWTs and I/O count thresholds (ICTs) defined for the I/O path (e.g., for the physical host port of the I/O path).

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also are referred to herein as host adapters ("Hs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
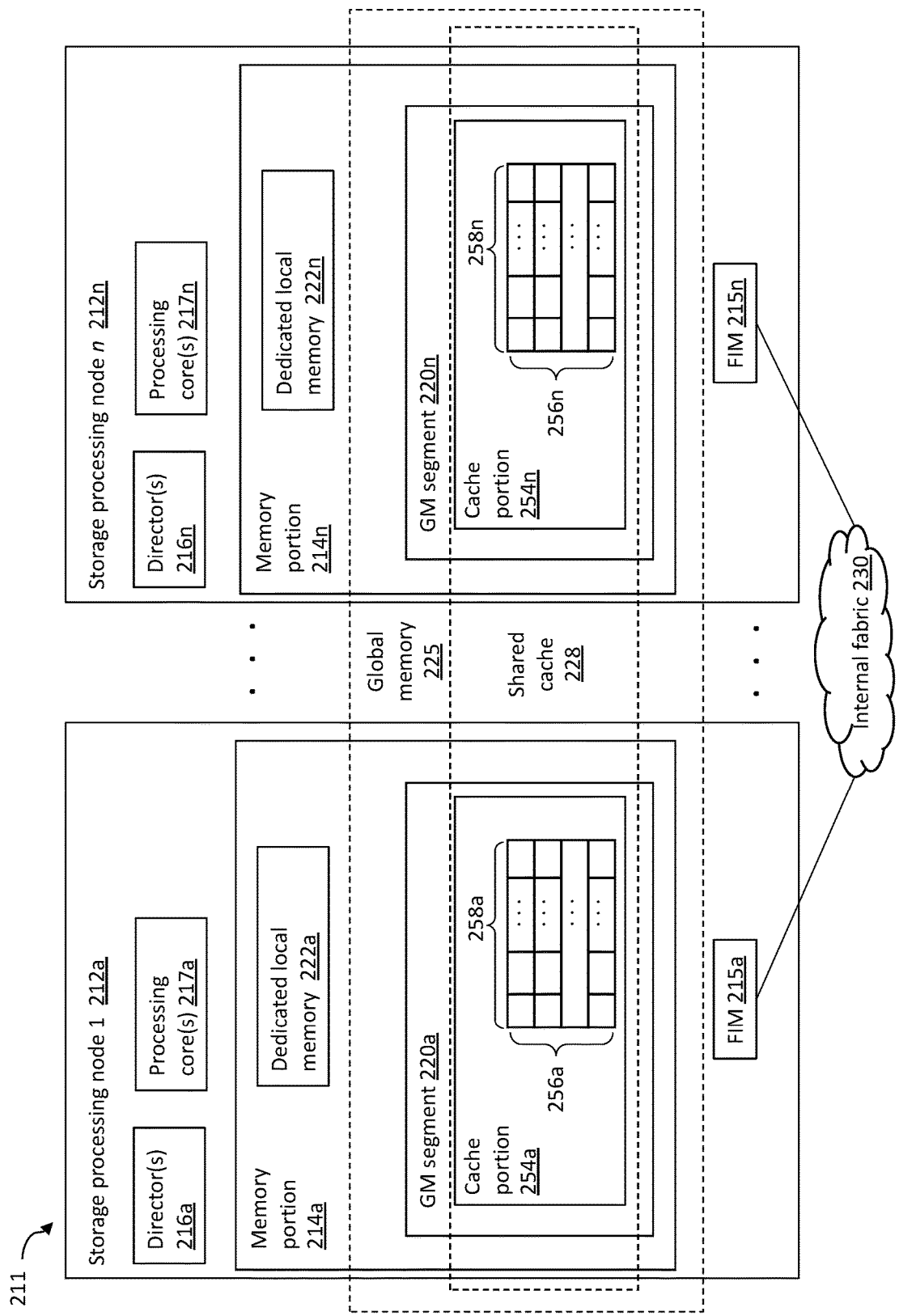
FIG. 2 is a block diagram illustrating an example of a storage system including multiple physically discrete storage processing nodes, according to embodiments of the invention.

Any of storage systems 20*a*-*n*, or one or more components thereof, described in relation to FIGS. 1-2 may be implemented using one or more Symmetrix™, VMAX™, VMAX3™ or PowerMax™ systems made available from Dell EMC.

Host systems 14*a*-*n* may provide data and control (e.g., management and access control) information to storage systems 20*a*-*n* over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20*a*) including multiple, physically discrete storage processing nodes (e.g., circuit boards) 212*a*-212*n*, which may be referred to herein as "processing nodes." Storage system 211 may include a plurality of processing nodes 212*a*-212*n* and a fabric 230 (e.g., internal fabric 30) over which the processing nodes 212*a*-*n* may communicate. Each of the processing nodes 212*a*-212*n* may include components thereon as illustrated. The switching fabric 230 may include, for example, one or more switches and connections between the switch(es) and processing nodes 212*a*-212*n*. In at least one embodiment, the fabric 230 may be an IB fabric. In some embodiments, multiple processing 212*a*-*n* nodes may be implemented on a single physically discrete component; e.g., two processing nodes 212*a*-*n* may be implemented on single engine of PowerMax storage system.

In the following paragraphs, further details are described with reference to processing node 212*a* but each of the N processing nodes in a system may be similarly configured. For example, processing node 212*a* may include any of: one or more directors 216*a* (e.g., directors 37*a*-*n*); memory portion 214*a*; one or more processing cores 217*a* including compute resources, for example, as part of a CPUs and/or a CPU complex for processing I/O operations; and a fabric interface module (FIM) 215*a* for interfacing the processing node 212*a* to an internal fabric 230. Each director 216*a* may be configured to operate, such as by executing code, as any one or more of an FA, BE, RA, and the like. In some embodiments, each of the directors, or a portion thereof, are implemented in software stored in a memory portion 214*a* (e.g., in a dedicated local memory 222*a*) that is executed by one or more of the processing cores 217*a*. Such software implementation of directors may be considered emulations of types of physical directors (i.e., directors implemented (at least primarily) in hardware).

Each FIM 215*a*-*n* may include one or more host channel adapters (HCAs) that physically couple, and are configured to enable communication between, its respective processing node 212*a*-*n*, and the internal fabric 230. In some embodiments, the internal fabric 230 may include multiple (e.g., 2) switches, and each HCA 215*a*-*n* may have multiple (e.g., 2) ports, each one connected directly to one of the switches.

Each of the processing nodes 212*a*-*n* may, respectively, also include memory portions 214*a*-*n*. The memory portion of each processing node may be characterized as locally accessible with respect to that particular processing node, and more specifically with respect to other components on the same processing node. For example, processing node 212*a* includes memory portion 214*a* which is memory that is local to that particular processing node 212*a*. Data stored in memory portion 214*a* may be directly accessed by any of the processing cores 217*a* (e.g., executing instructions on behalf of one of the directors 216*a*) of the processing node 212*a*. For example, memory portion 214*a* may be a fast memory (e.g., DIMM (dual inline memory module) DRAM (dynamic random access memory)) that is locally accessible by a director 216*a*, where data from one location in 214*a* may be copied to another location in 214*a* directly using DMA operations (e.g., local memory copy operations) issued by director 216*a*. Thus, the director 216*a* may directly access data of 214*a* locally without communicating over the fabric 230.

The memory portions 214*a*-214*n* of processing nodes 212*a*-*n* may be further partitioned into different portions or segments for different uses. For example, each of the memory portions 214*a*-214*n* may respectively include GM segments 220*a*-*n* configured for collective use as segments of a distributed GM, for example, GM 225 (e.g., GM 25*b*). Thus, data stored in any GM segment 220*a*-*n* may be accessed by any director 216*a*-*n* on any processing node 212*a*-*n*. Additionally, each of the memory portions 214*a*-*n* may respectively include dedicated local memories 222*a*-*n*. Each of the dedicated local memories 222*a*-*n* are respectively configured for use locally by the one or more directors 216*a*-*n*, and possibly other components, residing on the same single processing node. In at least one embodiment where there is a single director denoted by 216*a* (and generally by each of 216*a*-*n*), data stored in the dedicated local memory 222*a* may be accessed by the respective single director 216*a* located on the same processing node 212*a*. However, the remaining directors located on other ones of the N processing nodes may not access data stored in the dedicated local memory 222*a*.

To further illustrate, GM segment 220*a* may include information such as user data stored in the cache portion 220*a*, metadata, and the like, that is accessed (e.g., for read and/or write) generally by any director of any of the processing nodes 212*a*-*n*. Thus, for example, any director 216*a*-*n* of any of the processing nodes 212*a*-*n* may communicate over the fabric 230 to access data in GM segment

220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store I/O data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
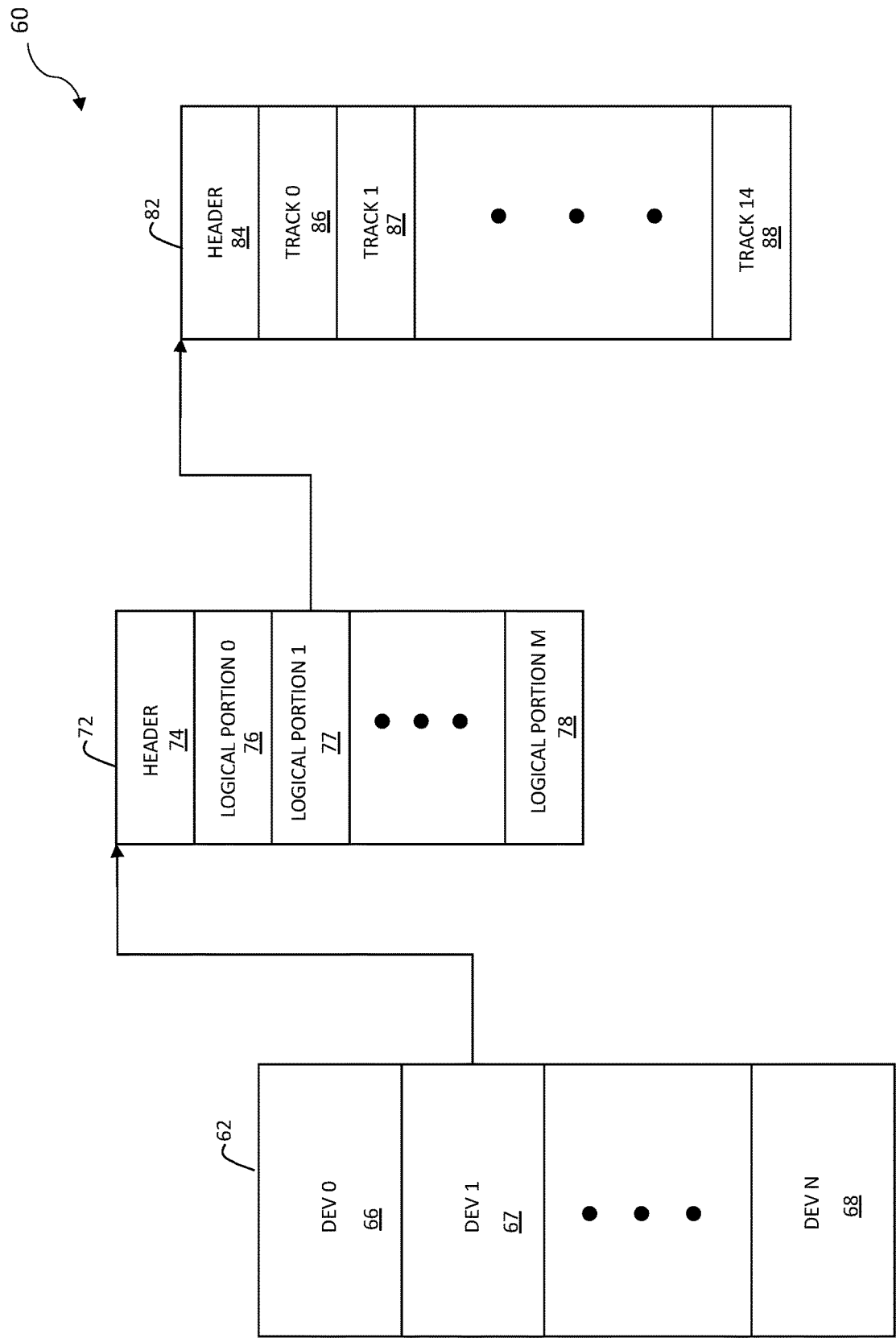
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 4 is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

The tables 62, 72, 72', 82 and 300 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n may also use and locally store portions of the tables 62, 72, 72', 82 and 300. Other data structures may be stored in any of GM 25b, memory 25a, GM segment 220a-n and/or dedicated local memories 22a-n.

Figure 5:
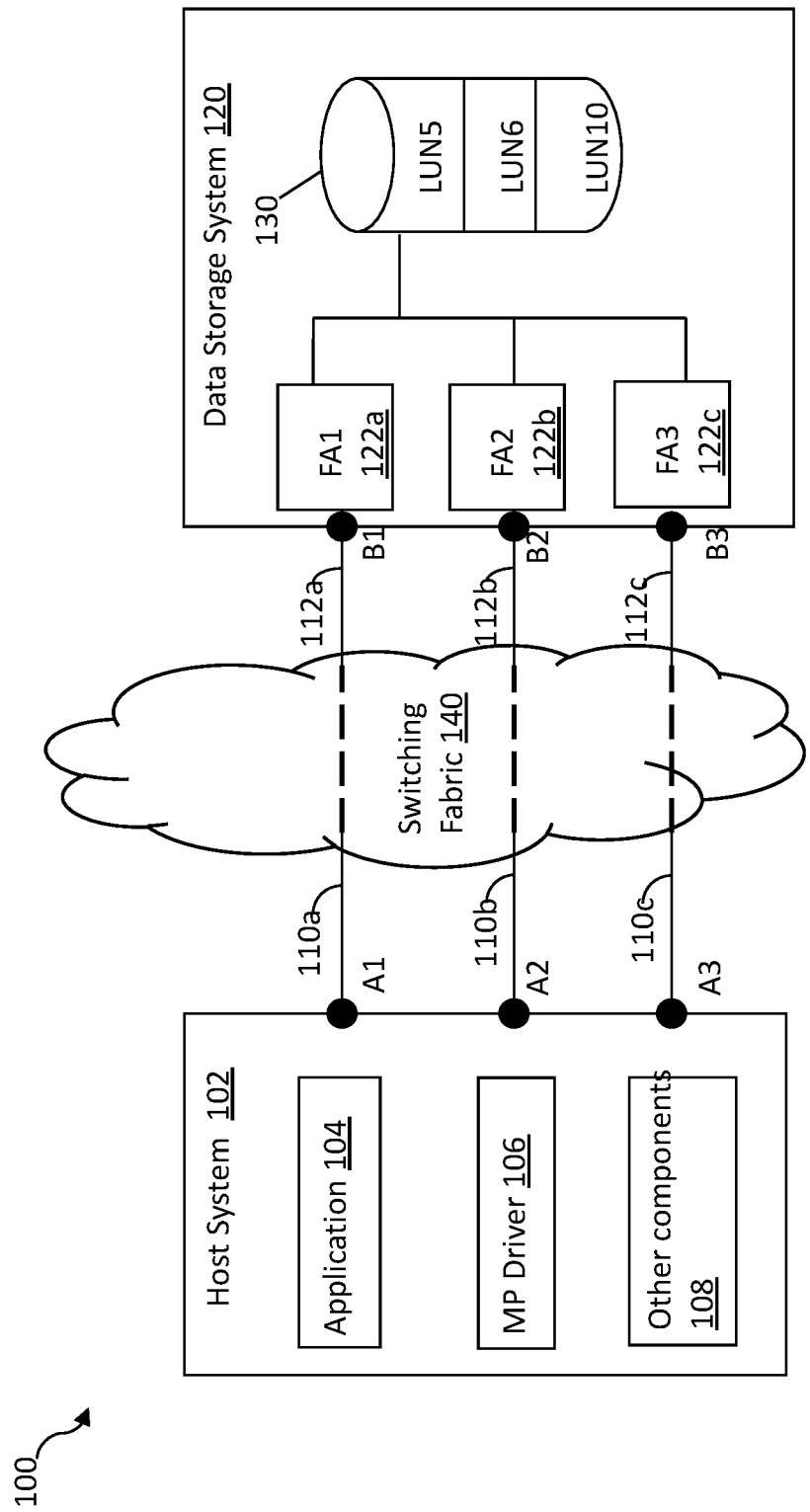
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 20a-n and/or one or more hosts 14a-14n, or variation thereof.

The system 100 may include a host system 102, switching fabric 140 (including one or more switches not shown) and data storage system 120. The host system 102 and data storage system 120 may communicate over one or more I/O paths through the switching fabric 140. Elements 110a-110c denote connections between the host system 102 and switching fabric 140. Element 112a-112c denote connections between the data storage system 120 and the switching fabric 140. Thus, switching fabric 140 may more generally considered a network providing the connectivity between the host system 102 and data storage system 120. The element 130 may represent a physical storage device of the data storage system 120, such as a rotating disk drive, flash-based or other solid state storage device, or the like, where the physical storage physical storage device 130 may be configured to include three LSUs—LUN5, LUN6 and LUN10. It should be noted that in the illustrative embodiment of FIG. 5, the system 100 includes only a single host system 102, single physical storage device 130 with 3 LSUs, and a single data storage system 120 for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LSUs of physical storage device 130, configured to be accessible to the host system 102 over multiple I/O paths. As such, each of the I/O operations may be forwarded from the application 104 to the data storage system 120 over one of the possible multiple I/O paths.

The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more I/O paths. For example, all LSUs of physical storage device 130 may be accessible using ports of the three FAs 122a-122c, also denoted respectively as host adapters FA1, FA2 and FA3. The multiple I/O paths allow the application I/Os to be routed over multiple I/O paths and, more generally, allow the LSUs of physical storage device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LSUs of the physical storage device 130 in order to determine which of the multiple I/O paths are active or available at a point in time, which of the multiple I/O paths are unavailable for communications, and to use such information to select an I/O path for host system-data storage system communications.

In the example of the system 100, each of the LSUs of the physical storage device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an FA of the data storage system 120. In the example of the system 100, elements A1, A2 and A3 each denote a port of a host system 102 (e.g., a port of an HBA), and elements B1, B2 and B3 each denote a port of an FA of the data storage system 120. Each of the LSUs of the physical storage device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system.

Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the I/O operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125a) or files (implemented using the file system 123), whereby such I/O requests may be mapped to I/O communications (specifying the I/O operation) directed to LSUs of the data storage system. Such I/O operations from the application layer 121 may be directed to the MP driver 106 after passing through any intervening layers such as, for example, the layers 123 and 125a. Communications between an initiator port of the host system and a target port of a data storage system (e.g., target port of an FA) may include those related to I/O operations and other non-IO commands such as related to host system control operations. I/O operations may include, for example, read and write operations with respect to data stored on an LSU.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an FA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an FA (e.g., such as B1-B3 of FIG. 5) in the data storage system. Through each such I/O path, one or more LSUs may be visible or exposed to the host system initiator through the target port of the data storage system.

Figure 7A:
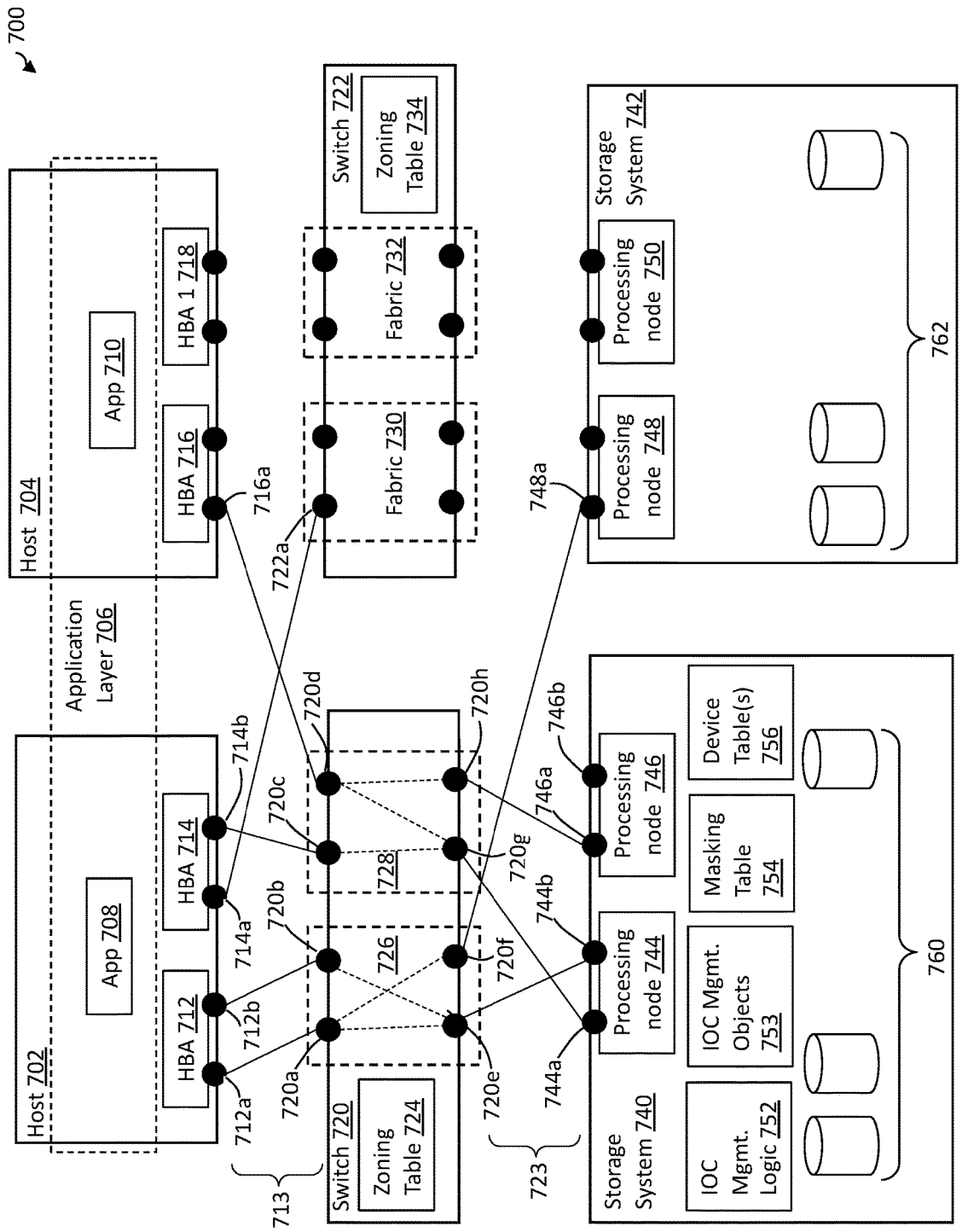
FIG. 7A is a block diagram illustrating an example of a storage network, according to embodiments of the invention.

FIG. 7A is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; other components; or any suitable combination of the foregoing.

It should be appreciated that, while only two hosts are shown, the system 700 may have significantly many more hosts, including tens, hundreds or even thousands more. The hosts 702 and 704 each may be physical host systems or virtual systems as part of a virtualized environment, and may be part of a host cluster and/or distributed across multiple physical devices and/or part of a cloud environment. Each of the hosts 702 and 704 may be a host system 102 described in relation to FIG. 5 or include any of the components thereof described herein. The application layer 706 may represents the collective application layers of the software stacks of the hosts 702 and 704, each of which may be an application layer 121 as described in relation to FIG. 6.

The host 702 may include any of: a portion of the application layer at 706; an application 708; HBAs 712 and 714; and host ports 712a, 712b, 714a and 714b. The portion of the application layer 706 running on the host 702 may include the application 708 and one or more other applications. The HBA 712 may include host ports 712a and 712b, and the HBA 714 may include host ports 714a and 714b. The HBAs 712 and 714 each may be separate discrete logical or physical components of the host 702, and the host 702 may include more than the two HBAs illustrated. Each of the host ports 712a, 712b, 714a and 714b may be connected to a switch port of switch 720 or 722 (referred to herein as a switch host port (SHP) or fabric port) by physical connections 713, which may be referred to herein as "host port links." Each such physical connection may be a cable and, in some embodiments, there is only enabled one physical connection between each host port and SHP (e.g., in accordance with a technology standard (e.g., FC)) as illustrated in FIG. 7A. That is, in some embodiments, each SHP is dedicated to one host port. FIG. 7A illustrates host ports 712a, 712b, 714a, 714b and 716a connected to SHPs over physical connections 713 in which there is only one physical connection 713 between each host port and each SHP.

The host 704 may include any of: a portion of the application layer at 706; an application 710; HBAs 716 and 718; and multiple host ports including host port 716a of HBA 716.

Figure 7B:
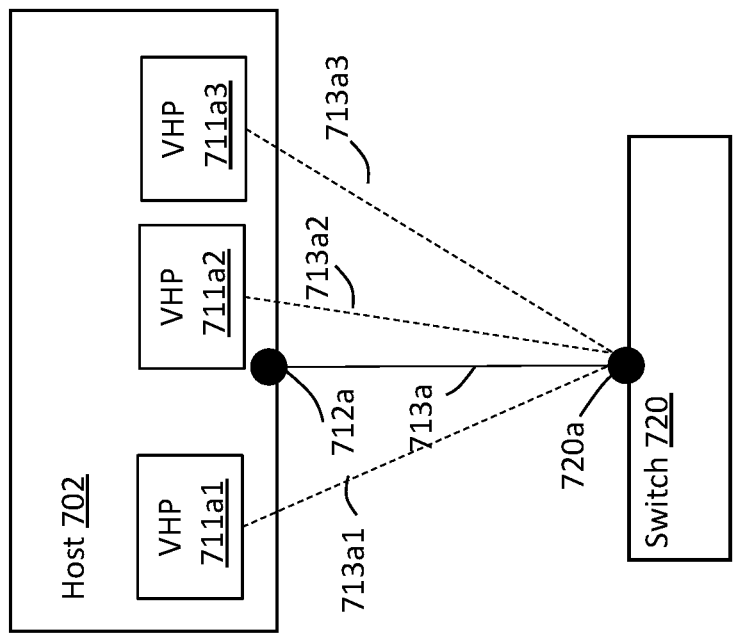
FIG. 7B is a block diagram illustrating an example of connections between a host and a switch, according to embodiments of the invention.

FIG. 7B is a block diagram illustrating an example of multiple logical I/O connections between a host and a switch, according to embodiments of the invention. Other embodiments of a storage network, for example, variations of what is illustrated in FIG. 7B, are possible and are intended to fall within the scope of the invention. As in FIG. 7A, physical host port 712a of host system 702 is connected to an SHP port 720a of the switch 720. Host system 702 may be configured to implement one or more forms of virtualization technology in which a plurality of virtual host ports (VHPs) 711a1, 711a2 and 711a3 are defined for a single physical host port 712a. That is, the host system 702 (e.g., a component thereof such as, for example, a multi-path driver (e.g., MP driver 106)) may have assigned different unique port IDs (e.g., WWNs) to each of VHPs 711a1, 711a2 and 711a3, even though they all map to the same physical host port 712a. Accordingly, one or more logical links 713a1, 713a2 and 713a3 corresponding to physical link 713a may be defined for VHPs 711a1, 711a2 and 711a3, respectively, between host 702 and switch 720.

It should be appreciated that switches (e.g., the switches 720 and 722) and storage systems (e.g., the storage systems 740 and 742) may not be configured to implement virtual host ports, and thus may not have knowledge that multiple port IDs map to the same physical host port. That is, from the perspective of a switch, storage system or other storage network component, the concept of a host port may be synonymous with a physical host port, as there is no concept of a virtual host port. For ease of reference, and in some cases taking into consideration a storage system's or switch's view of host ports, which does not include the concept of a virtual host port, the term "host port" may be used herein more generally, unqualified by the term "virtual" or "physical," to cover both virtual host ports and physical host ports.

Returning to FIG. 7A, the switch 720 may include any of: a zoning table 724, fabrics 726 and 728; ports 720a-h; other components; or any suitable combination of the foregoing. Each of the ports 720a-h ports configured to be connected (e.g., by a cable) to ports on a storage system (e.g., on a front-end of a storage system as part of a host adapter). Such switch ports may be referred to herein as switch storage ports ("SSPs") and the front-end ports of the storage system to which they connect referred to herein as front-end ports ("FEPs"). SSP may be connected to an FEP by physical connections 723, which may be referred to herein as "FEP links." Each such physical connection may be a cable and, in some embodiments, there is only enabled one physical connection between each SSP and FEP (e.g., in accordance with a technology standard (e.g., FC)) as illustrated in FIG. 7A. That is, in some embodiments, each SSP is dedicated to an FEP. FIG. 7A illustrates FEPs 744a, 744b and 746a connected to SSPs 720g, 720a and 720h, respectively, over physical connections 723 in which there is only one physical connection 723 between each FEP and each SSP.

The zoning table 724 may be a data structure that defines which host ports (as defined by a unique identifier such as a WWN), e.g., corresponding to host ports 712a, 712b, 714a, 714b and 716a, are enabled to communicate with which FEPs, for example, 744a, 744b, 746a, 746b and 748a. Zoning tables are described in more detail elsewhere herein. The switch 720 may use the information in the zoning table 724 to determine the internal switch connections between SHPs and SSPs to implement the defined zones, as illustrated by the dashed lines within switch 720 in FIG. 7A. The zoning table 724 or another data structure on switch 720 may define one or more logical fabrics, including logical fabrics 726 and 728, for example, by specifying the switch ports that are members of the logical fabrics.

A logical fabric is a logical entity that includes one or more SHPs and one or more SSPs as its members, for which I/O connectivity associated with the logical fabric are only permitted between the member SHPs and SSPs, and not with any SHP or SSP that is not a member of the fabric. A logical fabric may include SHPs and/or SSPs from different switches, or may include only SHPs and/or SSPs of a single switch, for example, all of the SHPs and/or SSPs of a switch or a subset thereof. A logical fabric may be considered to define a virtual SAN (i.e., "VSAN"). Each logical fabric may have a unique identifier referred to herein as a "fabric name," which may be synonymous with a VSAN name. For example, a data structure on the switch 720 or elsewhere may define that logical fabric 726 includes ports 720a, 720b, 720e and 720f.

The switch 722 may include any of: zoning table 734, logical fabrics 730 and 732; several ports including port 722a; other components; or any suitable combination of the foregoing. In some embodiments, one or both of switches 720 and 722 may be a Dell EMC Connectrix™ switch or director made available by Dell EMC.

The storage system 740 may include any of: I/O connection (IOC) management logic 752; IOC management objects 753; a masking table 754; device table(s) 756; s 744 and 746; FEPs 744a, 744b, 746a and 746b; BEs (not shown); physical storage devices 760; other components; and any suitable combination of the foregoing. Device table(s) 756 may define properties of LSUs of the storage system 740, including logical devices (which may include thin devices) corresponding to physical storage devices 760, as described in more detail elsewhere herein. The masking table 754 may define which host ports (e.g., 712a, 712b, 714a, 714b, 716a) are permitted to communicate with which LSUs over which FEPs (e.g., 744a, 744b 746a, 746b). Masking tables are described in more detail elsewhere herein.

The IOC management logic 752 may be configured with logic (software, hardware, firmware or a combination thereof) to perform one or processes in accordance with managing bandwidth on a storage network, for example, one or more of the methods described herein, or sub-steps thereof. The IOC management logic 752 may be configured to use the IOC management objects 753 to manage bandwidth for I/O connections on a storage network. The IOC management objects 753 may include one or more objects (e.g., data structures) for managing bandwidth for I/O connections on a storage network including, for example, any of data structures described in more detail elsewhere herein. The IOC management logic 752 or components thereof may be implemented as part of one or more FAs 21a-n and/or management module 22 described in relation to FIG. 1.

The storage system 742 may include any of the same or similar components as storage system 740, including processing node 748 and FEP 748a thereof, physical storage devices 762, IOC logic (not shown); IOC management objects (not shown); a masking table (not shown); and device table(s) (not shown). In some embodiments, each of the storage systems 740 and/or 742 may be a storage system 20a and/or 120 described in relation to FIGS. 1 and 5, respectively, or include one more components and/or functionality thereof.

Storage systems (e.g., the storage systems 740 and/or 742) may maintain data structures (e.g., masking tables) that define I/O connectivity in terms of LSUs, FEPs and host ports; i.e., which ports of a host system ("host ports"; e.g., SCSI initiators) are permitted to perform I/O communications with which LSUs (e.g., identified with, and sometimes referred to as, a Logical Unit Numbers (LUNs)) over which FEPs (e.g., SCSI targets). Defining (including initially defining and later modifying) which host ports are permitted to perform I/O communications with which LSUs over which FEPs, for example, using a masking table or other data structure, may be referred to as configuring or defining I/O connectivity between a host port, FEP and LSU, or more simply as "masking."

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table.

The data structure 800 may include a plurality of entries 810, each entry representing an LSU (e.g., logical device) identified in column 802 and specifying a host port (e.g., by World Wide Name (WWN)) in column 804 with which the identified LSU is enabled to communicate I/O over the FEP identified in column 806. Each entry 810 may correspond to an I/O connection on an I/O path between a host port and an FEP. Other information, for example, a host ID of the host system on which the host port resides, the HBA of the host port, other information relating to the host port learned during host registration, the FA associated with the FEP, a processing node (e.g., director board) on which the FEP resides, other physically discrete components of the storage system (e.g., an engine including the director board) within which the FEP resides, fabric name, and other information relating to the FEP, may be specified in column 808. A data structure other than a table, for example, a linked list and/or object-oriented data structure, may be used to record the same information.

It should be appreciated that one or more of the host port IDs specified in the data structure 800 may be IDs of virtual host ports, such that I/O connections corresponding to different entries, while they may appear to the storage system to have different physical host ports may in fact have the same physical host port that is mapped-to by the different virtual host ports.

To properly configure I/O connectivity between host ports, FEPs and LSUs, it may be necessary to know the permissible I/O paths between host ports and FEPs (e.g., across a switching fabric), which may be defined by zoning tables on one or more switches of a switching fabric. Switches may include zoning tables that define the logical connections between SHPs and SSPs of the switch; e.g., by specifying pairs of host port IDs (e.g., WWNs) and FEP IDs (WWNs), each pair specifying a host port ID and an FEP ID, each identified host port corresponding to a directly connected (e.g., by an FC cable) SHP of the switch and each identified FEP corresponding to a directly connected SSP of the switch. Thus, the zoning table of a switch defines permissible I/O paths between a host system and a storage system over the switch, each I/O path defined by (and including) a host port and an FEP. Such I/O paths may be referred to herein as "zoned I/O paths" or "enabled I/O paths," and the process of defining (including initially defining and later modifying) enabled I/O paths in a zoning table, or the resulting enabled I/O paths collectively, may be referred to herein as "zoning."

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. The data structure 900 may be a zoning table, and may include a plurality of entries 910, each entry representing an initiator port (e.g., a host port) in column 902 and a target port (e.g., an FEP) in column 904 with which the initiator port is permitted to communicate over a switching fabric. Other information, for example, host, HBA, FA, processing node (e.g., director board), other physically discrete components the storage system (e.g., an engine including the director) corresponding to the target port, fabric name, etc., may be specified in column 906, where fabric name is an identifier of the logical fabric to which the specified initiator port and target port belong. A data structure other than a table, for example, a linked list and/or object-oriented data structure, may be used to record the same information.

It should be appreciated that one or more of the host port IDs specified in the data structure 900 may be IDs of virtual host ports, such that I/O paths corresponding to different entries, while they may appear to the switch (and other network components (e.g., a storage system) that consume the data structure) to have different physical host ports may in fact have the same physical host port that is mapped-to by the different virtual host ports.

After a switch has been zoned during an initial configuration of a network, and perhaps later if a switch is rezoned, host ports may log into FEPs. A host port logging into an FEP may include the host port and FEP exchanging unique identifiers (e.g., WWNs) and other information, for example, in accordance with an FC protocol. The log-in process also may include the host port inquiring to the FEP about any LSUs available through the FEP, for example, by issuing a REPORT LUNS command in accordance with a SCSI protocol. The FEP may respond with a list of LSUs available to the host port through the FEP, for example, by providing a list of LSU identifiers (e.g., LUNs), after which host registration may be performed. Host registration may include the host port providing host information to the FEP, including, for example: a unique host ID (e.g., a host name), host operating system (OS), OS level, host vendor and model, vendor unique (VU) commands used by the host, virtual machines (VMs) running on the host, and/or other host information.

During the login of a host port to an FEP, a log-in table may be updated. Each entry of the log-in table may represent and specify a host port and an FEP into which the host port logged. For ease of reference, this host port-FEP combination of each entry may be referred to herein as an I-T (initiator-target) pair, even though the invention is not limited to SCSI technology. Each log-in table entry may specify an I-T pair and other information pertaining to the I-T pair.

In some embodiments, one or more of the data structures 62, 72, 72', 82, 800 and 900 may be augmented with information for managing bandwidth in connection with FEPs as described herein. In other embodiments, separate data structures may be provided for managing bandwidth in relation to FEPs of a storage system, for example, bandwidth management objects 753, which may include data structure 1000 described in more detail elsewhere herein. It should be appreciated that one or more of the data structures 62, 72, 72', 82, 800, 900 and 1000, or information contained therein, may be combined in one or more data structures, either as a variation of the one of the foregoing data structures or in a different data structure altogether.

FIG. 10 is a block diagram illustrating an example of a data structure 1000 for maintaining information for physical host port groups of an FEP, according to embodiments of the invention. Other embodiments of a data structure for maintaining information for physical host port groups of an FEP, for example, variations of the data structure 1000, are possible and are intended to fall within the scope of the invention. Data structure 1000 may be referred to herein as a PHP group table, and may be included in the management objects 753.

The PHP group table 1000 may include a plurality of entries 1001, each entry representing a PHP group corresponding to an FEP. A PHP group may be defined for the physical host port, and may include the virtual host port(s) associated with an I/O connection between the FEP and the physical host port. For each FEP of a storage system, a PHP group table 1000 may include an entry for any physical host port for which the FEP has at least one I/O connection.

Each entry may include a PHP group ID in column 1002, a BWT for the physical host port in a column 1004, an ICT for the physical host port in a column 1006, a current cumulative bandwidth consumption for I/O paths associated with the physical host port in a column 1008; a current cumulative I/O transmission rate (ITR) for I/O paths associated with the physical host port in a column 1010 and I/O connection information for each I/O connection associated with the PHP group in columns 1012-1018. Each column 1012-1018 may specify a host port ID (e.g., a WWN) of the virtual host port of the I/O connection it represents, which may serve as an identifier of the I/O connection. Each column 1012-1018 may include other information about the I/O connection including current bandwidth consumption and I/O transmission rate values.

It should be appreciated that, in some embodiments, rather than having a separate PHP group table 1000 for each FEP of a storage system, a PHP group table may be configured to represent a plurality (e.g., all) FEPs on a storage system, where each entry 1001 also specifies an FEP ID (e.g., WWN) in an FEP ID column (not shown), such that the FEP ID and physical host port ID specified in each entry defines the I/O path represented by the entry. The PHP table 1000 and/or variations thereof may be used to manage bandwidth consumption and I/O transmission rates on I/O connections, as described in more detail elsewhere herein.

Figure 11:
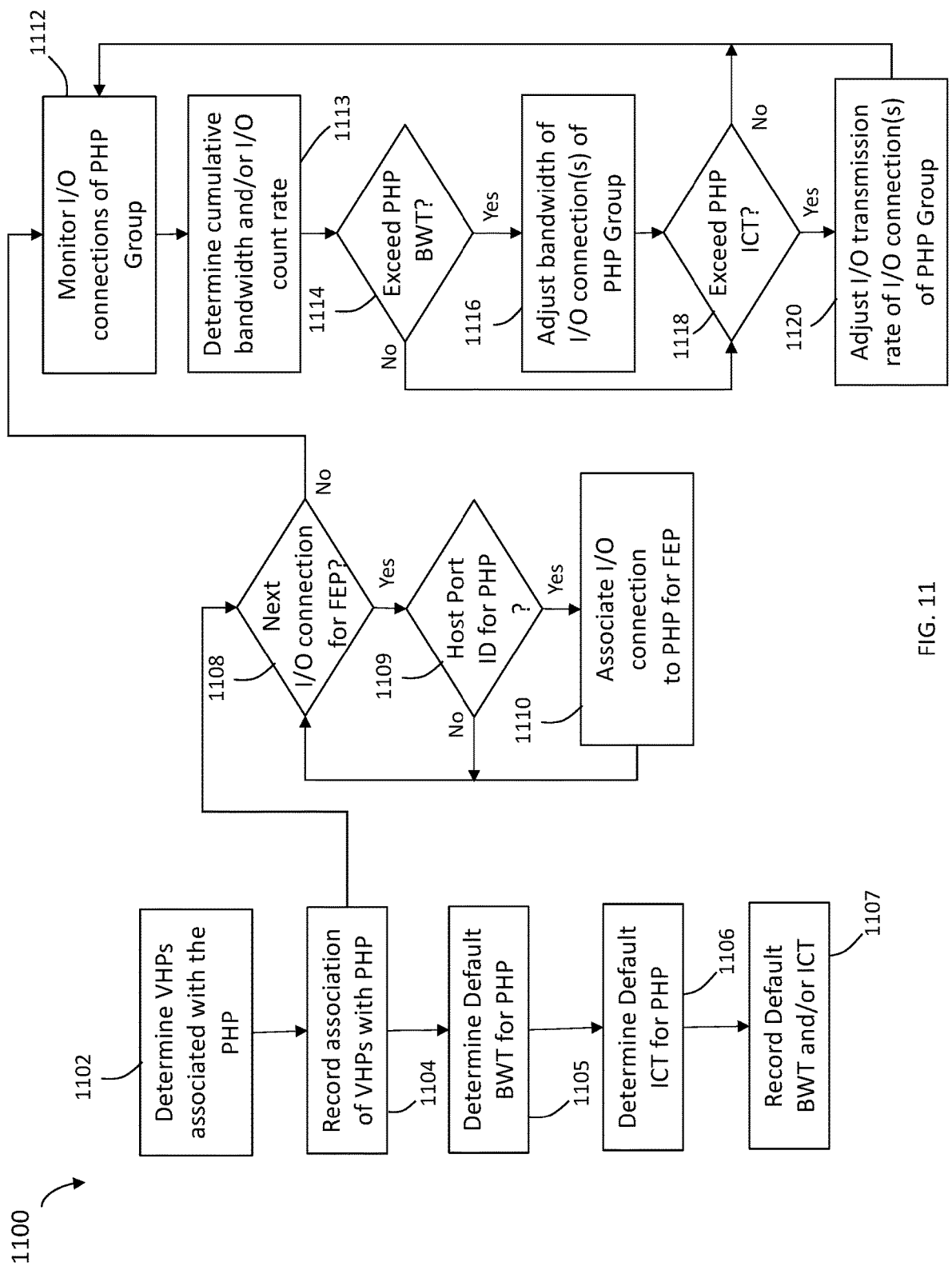
FIG. 11 is a flowchart illustrating an example of a method of managing I/O connections associated with a virtual host port, according to embodiments of the invention.

FIG. 11 is a flowchart illustrating an example of a method 1100 of managing I/O connections between an FEP and a physical host port associated with a virtual host port, according to embodiments of the invention. Other embodiments of a method of managing I/O connections between an FEP and a physical host port associated with a virtual host port, for example, variations of the method 1100, are possible and are intended to fall within the scope of the invention. For example, the method is not limited I/O communications between an FEP and a physical host port, but may be applied to any port of a storage system (e.g., a port of an RA) exchanging I/O communications with ports of other components (e.g., back-up appliances, other storage systems) of a storage network.

In a step 1102, the virtual host ports associated with the physical host port may be determined, for example, by performance of the method 1200 described below. In a step 1104, the virtual host ports associated with the physical host port may be recorded, for example, in an entry 1001 of the PHP group table for the physical host port.

In a step 1105, a default BWT for the physical host port with respect to I/O communications with the FEP may be determined. For example, the default BWT for the physical host port may have been negotiated between a the physical host port and a switch between the host system and the storage system when the physical host port logged into the switch using known techniques. The storage system may learn the negotiated BWT by interrogating the one or more switches between on I/O paths between the FEP and physical host port and determining, for the two or more communication links between the FEP and the physical host port, a maximum transmission rate (i.e., bandwidth) negotiated (e.g., between a switch and another switch, host port or FEP) for the communication link. These transmission rates may be determined, for example, by the FEP issuing certain commands to the switch(es) to which the FEP is connected that specify an identifier of a physical host port, which may be a standard host ID that represents a single physical hot port or may be a VHP ID of a virtual host port of the physical host port in question. In the following description, the ID is a VHP ID. The FEP may issue such commands to the switch (es) after the virtual host port has logged into the FEP and/or after the host system in question has registered with the storage system of the FEP, as described in more detail elsewhere herein.

For example, referring to the storage network 700 described in relation to FIG. 7A, the FEP 744*b* may issue a Get Fabric Port Name (GFPN) command to the SSP 720*e* in accordance with a Fibre Channel (FC) protocol. The GFPN command may specify an identifier of a virtual host port associated with the host port 712*a* (e.g., its word-wide name (WWN)), resulting in the SHP (720*a*) that is physically linked to the physical host port 712*a* being identified, and this identity being returned to the FEP 744*b* from the SSP 720*e* in an FC ACC (accept) communication. The FEP 744*b* then may issue a Get Port Speed Capacity (GPSC) command specifying the SHP ID to learn the maximum transmission rate (i.e., bandwidth) of the communication link between the physical host port 712*a* and the fabric port 720*a*, which itself may be based on the lower of the bandwidth capacity of the physical host port 712*a* and the bandwidth capacity of the SHP 720*a*. This maximum bandwidth of the communication link may be communicated to the FEP 744*b* by the SSP 720*e* in an FC command. This process may be repeated for any physical links between switches along the I/O path between the FEP and physical host port. The lowest maximum bandwidth may be determined from among the maximum bandwidth of transmission links determined from the foregoing process and the maximum bandwidth (i.e., bandwidth capacity) of the FEP itself. This lowest maximum bandwidth may serve as the default BWT for the physical host port with respect to the FEP, i.e., the default BWT for the I/O path between the physical host port and the FEP.

The step 1105 may detect a slow drain condition on the I/O path between the FEP and the physical host port, where the physical host port has a lower maximum bandwidth than the FEP, and address the slow drain condition by selecting the lower maximum bandwidth of the physical host port as the BWT of the I/O path, thereby reducing latency and resulting performance degradation on a storage network. In some embodiments of the invention, establishing the BWT of an I/O path between an FEP and a physical host port may be implemented as described in U.S. patent application Ser. No. 16/374,182, titled "Storage-Based Slow Drain Detection and Automated Resolution", by Scott Rowlands et al., filed Apr. 3, 2019, the entire contents of which are hereby incorporated by reference.

In a step 1106, an I/O count threshold (ICT) may be determined for the physical host port in question, for example, in a same or similar manner to as described above for determining a default BWT for the physical host port. An ICT may be a threshold number of I/O communications that may be transmitted to and/or from the physical host port per a unit time. In a step 1107, the determined BWT and/or the determined ICT for the physical host port may be recorded, for example, in the PHP group table 1000.

After an initial performance of the steps 1102 and 1104, the steps 1108-1110 may be performed, for example, concurrently to performance of the steps 1105-1107. The steps 1108-1110 may loop through all I/O connections for the FEP known to the storage system, for example, by accessing one or more the data structures defined herein, e.g., data structure 900 and/or PHP group table 1000. In a step 1108, it may be determined whether there is a next I/O connection for the FEP to be considered. If so, then, in a step 1109, it may be determined whether a host port ID defined for the I/O connection is mapped to (i.e., associated with) the physical host port for which the method 1100 is being performed. This may be determined by accessing one or more data structures on the storage system, for example, data structure 900 and/or the PHP group table 1000, which may have been initially populated and later updated in the step 1104.

If it is determined that the host port ID of the current I/O connection being considered is not mapped to the physical host port, the method 1100 may return to the step 1108. Otherwise, the method 1100 may proceed to the step 1110. In the step 1110, the current I/O connection may be associated with the physical host port for the FEP, and the association may be recorded in one or more data structures, for example, the PHP group table 1000. It should be appreciated that, in some embodiments of the invention, the performance of the steps 1108-1110 may be integrated with the performance of the steps 1102 and 1104.

If it is determined in the step 1108 that there is not a next I/O connection for the FEP to be considered, the loop through steps 1109-1110 may end, and the method 1100 may proceed to a step 1112. The steps 1108-1110 may be repeated again at a later time, for example, per a schedule (e.g., periodically) and/or in response to an event (e.g., user input or system reboot).

The steps 1112-1120 may be performed after an initial performance of the steps 1102-1107 and the steps 1108-1110, and concurrently thereto for any future performances thereof. The I/O connections associated with the PHP for the FEP may be monitored. For example, for each I/O connection, the bandwidth consumption rate of each I/O connection and the rate of I/O transmission (e.g., the number of I/O communications transmitted per unit time) of each I/O connection may be monitored.

For example, for the one or more I/O associated with the physical host port, the bandwidth consumption of each I/O connection may be monitored, which may include tracking the amount of bandwidth consumed, or queued to be consumed, on each I/O connection during a temporal interval, and/or how many I/O communications are transmitted, or queued to be transmitted, on each I/O connection during a temporal interval. The determined bandwidth consumption and I/O rate information for I/O paths for monitored intervals may be stored in one or more data structures, including one or more of the data structures described herein. For example, for each I/O connection, the bandwidth consumption information and/or I/O transmission rate information for a current monitored interval may be stored in the appropriate column of the appropriate entry 1001 of the PHP group table 1000 that represents the I/O connection.

In the step 1113, a cumulative bandwidth consumption rate and cumulative I/O transmission rate for the physical host port may be determined from the individual I/O connection values. For example, the values from the individual I/O connections may be added together. The cumulative bandwidth consumption rate and cumulative I/O transmission rate may be stored in the appropriate entry 1001 of the PHP group table 1000.

In a step 1114, it may be determined whether the current cumulative bandwidth consumption rate exceeds the BWT (e.g., determined in the step 1105) of the physical host port. The BWT may be obtained from a data structure on the storage system, for example, the PHP group table 1000. If the BWT is not exceeded, the method may proceed to a step 1118. Otherwise, in a step 1116, a bandwidth adjustment may be made to one of the I/O connections to reduce the cumulative bandwidth consumption rate below the BWT for the physical host port.

In a step 1118, it may be determined whether the current I/O transmission rate to/from the physical host port exceeds the ICT (e.g., determined in the step 1106) of the physical host port. The ICT may be obtained from a data structure on the storage system, for example, the PHP group table 1000. If the ICT is not exceeded, the method may return to the step 1112 and continue monitoring I/O connections (which may be continued concurrently to performance of the steps 1113-1120). Otherwise, in a step 1120, an I/O transmission rate adjustment may be made to one or more of the I/O connections to reduce the cumulative I/O transmission rate below the ICT for the physical host port. After the step 1102, the method 1100 may return to the step 1112.

Figure 12:
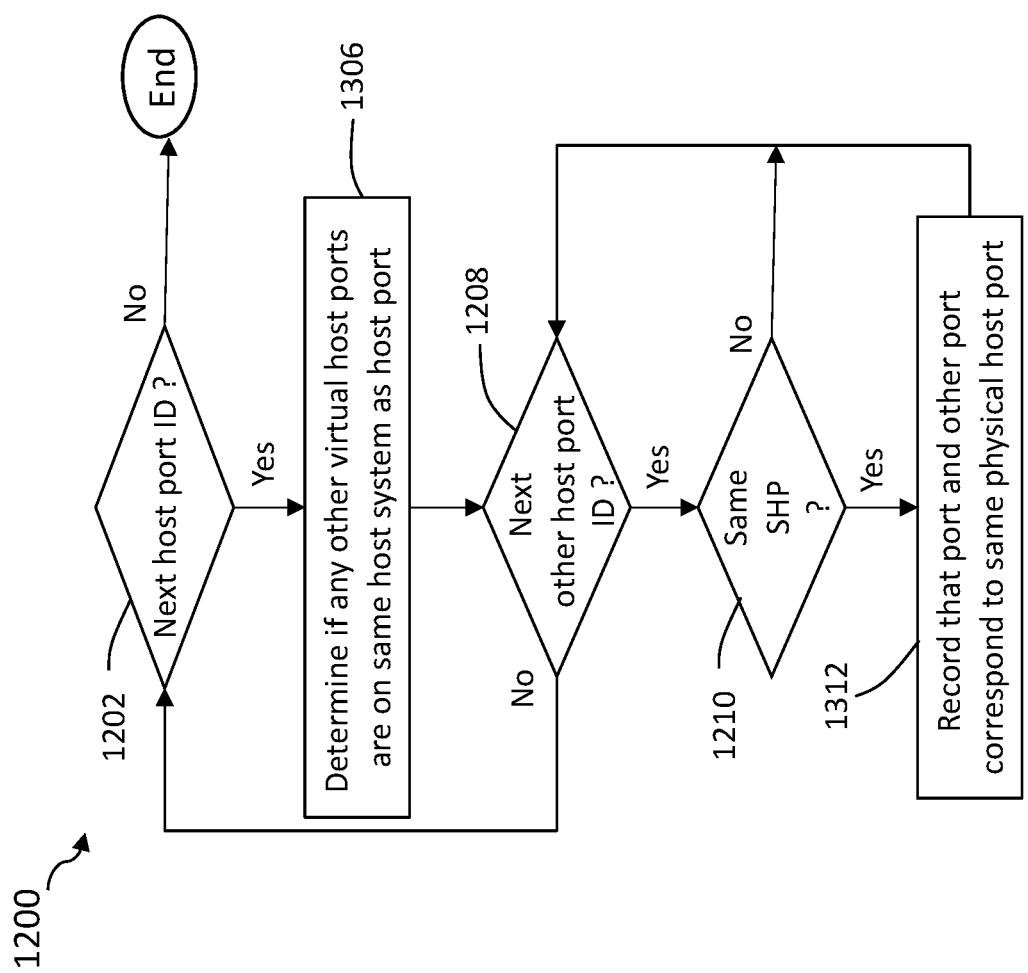
FIG. 12 is a flow chart illustrating an example of a method of determining whether multiple virtual host ports share a same physical host port, according to embodiments of the invention.

FIG. 12 is a flow chart illustrating an example of a method 1200 of determining whether multiple virtual host ports share a same physical host port, according to embodiments of the invention. Other embodiments of a method of determining whether multiple virtual host ports share a same physical host port, for example, variations of method 1200, are possible and are intended to fall within the scope of the invention. Method 1200 may be performed by a component on a storage system, for example, IOC management logic 752 described above in relation to FIG. 7A.

Method 1200 may be performed for each virtual host port on a host system, either at a time when each such virtual host port logs into the system, at a scheduled time (e.g., periodically) or in response to an another event (e.g., a user initiating the method). For example, in some embodiments, method 1200 may be performed sequentially for multiple virtual host ports communicatively coupled to a storage system, such as will now be described in relation to FIG. 12.

The storage system may have knowledge of a list of host IDs of a host system resulting from host log-in and/or host registration, as described elsewhere herein, and the method 1200 may loop through this list. In step 1202, it may be determined whether there is a next host port ID (e.g., from a list on the storage system) to be processed, and if so, method 1200 may proceed to step 1206.

In step 1206, it may be determined if any other virtual host ports are on the same host system as the virtual host port currently being processed, for example, based on the current host port ID. For example, in some embodiments of the invention, when a host system, or more particularly a virtual host port of a host system, logs onto the storage system, an identifier (e.g., name) of the host system may be recorded on the storage system and associated with the host port ID (e.g., WWN) of each virtual host port of the host system. For example, this information may be recorded in an I/O path table of the IOC management objects 753 described above in relation to FIG. 7A. This recorded host system name and association with host port IDs may be used in the step 1206 to determine if any other virtual host ports are on the same host system as the virtual host port currently being processed; e.g., by comparing host system IDs associated with each port ID.

By identifying any other virtual host ports that are on the same host system as the current virtual host port, the field of potential virtual host ports that may be on a same physical host port may be reduced, saving time and system resources. That is, only the virtual host ports on the same host system may be sharing a same physical host port, so if this information is known there is no need to check all other host port IDs of which the storage system is aware. It should be appreciated that without knowledge of the host name and its associated host port IDs, the storage system may be unaware of whether or not any of the virtual host ports of which it has knowledge are on a same host system.

In step 1208, it may be determined whether there is a next host port ID to consider, which may be a next of the host port IDs of which the storage system has knowledge (e.g., from log-ins or otherwise), or be a next host port ID of the hosts ports on the same host system as the current host port under consideration as determined in step 1206. If there is a next other host port ID, then in step 1210 it may be determined whether next other host port ID is for a virtual host port connected to the same SHP as the virtual host port currently under consideration, for example, by accessing an I/O path table as described in more detail elsewhere herein.

In embodiments in which FC technology is used, step 1210 may include issuing one or more GFPN_ID queries from the storage system to a logical fabric (on a switch) connecting the current virtual host port (e.g., learned during login) to the storage system under consideration. Prior to sending this communication, it may be determined whether the current virtual host port and the other virtual host port are connected to the storage system using the same logical fabric, for example, by using their respective port IDs to consult an I/O path table as described in more detail elsewhere herein. That is, if the two virtual ports are not on the same logical fabric, then it may not be possible (depending on the technology used and configuration thereof) that they use the same SHP port. If it determined that the two virtual host ports are connected to the same logic fabric (or if such a determination was not even considered), a single GFPN_ID query may include port IDs (e.g., WWNs) of both the current virtual host port and the other virtual host port, or a separate GFPN_ID query may be sent for each virtual host port, each query including the port ID of each virtual host port, respectively. For example, an initial query may be sent for the current host port and then additional queries may be sent for each other host port determined in step 1208. It should be appreciated that in embodiments in which FC technology is not used, a communication may be sent from the FEP to an SSP using a different technology to determine fabric ports corresponding to host ports.

In step 1210, in response to the query sent from the storage system port to the switch (e.g. including one or more WWNs), the switch may return a communication indicating the one or more SHPs (i.e., fabric ports) corresponding to the one or more host port IDs (e.g., WWNs), respectively, included in the query. The SHP values returned by the switch in response to the one or more queries may be compared to determine whether they specify the same SHP. If it is determined in step 1210 that the current virtual host port (e.g., having a host port ID "WWNx") and the other host port (e.g., having a host port ID "WWNy") are connected to the same SHP (e.g., having a switch port ID "WWNz"), then it may be concluded that the current virtual host port and the other virtual host port correspond to a same physical host port of a host system; i.e., share a same physical host port, and this information may be recorded. This conclusion may be based in part on a requirement imposed by technology (e.g., FC) employed on the storage network that, at any given time, each SHP may be physically connected to only one physical host port (e.g., by a cable).

After the performance of the step 1212 or if the step 1210 returns negative, the method 1200 may return to the step 1208. If it is determined in the step 1208 that there is no next other host port ID, then the method 1200 may return to the step 1202. If it is determined in the step 1202 that there is no next host port ID to process, then method 1200 may end, as the analysis has been completed of determining whether there are multiple virtual host ports communicatively coupled to the storage system that share a same physical host port (e.g., in accordance with NPIV technology).

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1100 and 1200, or parts thereof, may be implemented using one or more of the systems and/or data structures described in relation to FIGS. 1-10 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a system comprising a host system and a storage system, wherein the host system includes a first physical host port, a method comprising:
    determining, by the storage system, a plurality of virtual host ports of the host system that are associated with the first physical host port of the host system, wherein I/Os operations are sent from the plurality of virtual host ports over the first physical host port of the host system to a first storage system port of the storage system;
    for the first storage system port of the storage system, determining, by the storage system, a plurality of I/O (input/output) connections between the host system and the storage system, wherein each of the plurality of I/O connections includes the first storage system port and one of the plurality of virtual host ports associated with the first physical host port;
    determining a predefined bandwidth threshold for the first physical host port with respect to I/O communications between the first physical host port and the first storage system port including:
        detecting a slow drain condition on an I/O path between the first physical host port and the first storage system port where a first link between the first physical host port and a switch has a first maximum bandwidth which is less than a second maximum bandwidth of a second link between the switch and the first storage system port; and
        responsive to detecting the slow drain condition, selecting a lower of the first maximum bandwidth and the second maximum bandwidth as the predefined bandwidth threshold for the first physical host port;
    monitoring a cumulative bandwidth consumption rate on the plurality of I/O connections each identifying an I/O connection between the first storage system port of the storage system and one of the plurality of virtual host ports associated with the first physical host port; and
    if the cumulative bandwidth consumption rate on the plurality of I/O connections between the first storage system port and the plurality of virtual host ports which are associated with the first physical host port exceeds the predefined bandwidth threshold of the first physical host port, reducing bandwidth consumption on at least a first of the plurality of I/O connections between the first storage system port of the storage system and a first of the plurality of virtual host ports associated with the first physical host port.

2. The method of claim 1, wherein the system further includes a switch, and wherein said determining the plurality of virtual host ports that are associated with the first physical host port includes:
    determining that respective host port IDs (identifiers) of the plurality virtual host ports correspond to a same port of the switch physically linked to the first physical host port.

3. The method of claim 2, wherein said determining said plurality of virtual host ports that are associated with the first physical host port includes:
    the storage system sending one or more queries to the switch, each of the one or more queries including an identifier of at least one of the plurality of virtual host ports; and
    the switch sending to the storage system one or more responses to the one or more queries, the one more responses including, for each of the at least one of the plurality of virtual host ports, an identifier of a same SHP (switch host port of the switch) physically linked to the first physical host port.

4. The method of claim 3, wherein each of the one more queries is a GFPN (Get Fabric Port Name) query in accordance with a Fibre Channel protocol.

5. The method of claim 1, further comprising:
    maintaining a data structure including a plurality of entries, each entry representing a physical host port having at least one I/O connection with the physical host port of the host system, wherein the data structure includes a first entry representing the first physical host port and specifying the plurality of I/O connections.

6. The method of claim 1, wherein the first physical host port has a predefined I/O count threshold (ICT) denoting a threshold rate of I/O communications transmitted to and from the first physical port, and the method further comprises:
    monitoring a cumulative I/O transmission rate on the plurality of I/O connections, wherein the cumulative I/O transmission rate denotes an aggregated rate of I/O communications transmitted on the plurality of I/O connections; and
    if the cumulative I/O transmission rate exceeds the predefined ICT of the first physical host port, reducing a current I/O transmission rate on one or more of the plurality of I/O connections.

7. The method of claim 1, wherein each of the plurality of virtual host ports is an NPIV (N_Port ID Virtualization) initiator.

8. A system comprising:
    a host system including a first physical host port having a predefined bandwidth threshold; and
    a storage system including executable logic that implements a method including:
        determining a plurality of virtual host ports of the host system that are associated with the first physical host port of the host system, wherein I/Os operations are sent from the plurality of virtual host ports over the first physical host port of the host system to a first storage system port of the storage system;
        for the first storage system port of the storage system, determining a plurality of I/O (input/output) connections between the host system and the storage system, wherein each of the plurality of I/O connections includes the first storage system port and one of the plurality of virtual host ports associated with the first physical host port;
        determining a predefined bandwidth threshold for the first physical host port with respect to I/O communications between the first physical host port and the first storage system port including:
            detecting a slow drain condition on an I/O path between the first physical host port and the first storage system port where a first link between the first physical host port and a switch has a first maximum bandwidth which is less than a second maximum bandwidth of a second link between the switch and the first storage system port; and
            responsive to detecting the slow drain condition, selecting a lower of the first maximum bandwidth and the second maximum bandwidth as the predefined bandwidth threshold for the first physical host port;
        monitoring a cumulative bandwidth consumption rate on the plurality of I/O connections each identifying an I/O connection between the first storage system port of the storage system and one of the plurality of virtual host ports associated with the first physical host port; and
        if the cumulative bandwidth consumption rate on the plurality of I/O connections between the first storage system port and the plurality of virtual host ports which are associated with the first physical host port exceeds the predefined bandwidth threshold of the first physical host port, reducing bandwidth consumption on at least a first of the plurality of I/O connections between the first storage system port of the storage system and a first of the plurality of virtual host ports associated with the first physical host port.

9. The system of claim 8, wherein the system further includes a switch, and wherein said determining the plurality of virtual host ports that are associated with the first physical host port includes:
    determining that respective host port IDs of the plurality virtual host ports correspond to a same port of the switch physically linked to the first physical host port.

10. The system of claim 9, wherein said determining the plurality of virtual host ports that are associated with the first physical host port includes:
    the storage system sending one or more queries to the switch, each of the one or more queries including an identifier of at least one of the plurality of virtual host ports; and
    the switch sending to the storage system one or more responses to the one or more queries, the one more responses including, for each of the at least one of the plurality of virtual host ports, an identifier of a same SHP physically linked to the first physical host port.

11. The system of claim 10, wherein each of the one more queries is a GFPN query in accordance with a Fibre Channel protocol.

12. The system of claim 8, wherein the method further comprises:
    maintaining a data structure including a plurality of entries, each entry representing a physical host port having at least one I/O connection with the physical host port of the host system, wherein the data structure includes a first entry representing the first physical host port and specifying the plurality of I/O connections.

13. The system of claim 8, wherein the first physical host port has a predefined ICT, and the method further comprises:
- monitoring a cumulative I/O transmission rate on the plurality of I/O connections, wherein the cumulative I/O transmission rate denotes an aggregated rate of I/O communications transmitted on the plurality of I/O connections; and
- if the cumulative I/O transmission rate exceeds the predefined ICT of the first physical host port, reducing a current I/O transmission rate on one or more of the plurality of I/O connections.

14. The system of claim 8, wherein each of the plurality of virtual host ports is an NPIV initiator.

15. One or more non-transitory computer-readable media having executable code stored thereon, that, when executed, performs a method comprising:
- determining, by a storage system, a plurality of virtual host ports of a host system that are associated with a first physical host port of the host system, wherein the first physical host port has a predefined bandwidth threshold, wherein the host system and the storage system are included in a system, wherein I/Os operations are sent from the plurality of virtual host ports over the first physical host port of the host system to a first storage system port of the storage system;
- for the first storage system port of the storage system, determining, by the storage system, a plurality of I/O connections between the host system and the storage system, wherein each of the plurality of I/O connections includes the first storage system port and one of the plurality of virtual host ports associated with the first physical host port;
- determining a predefined bandwidth threshold for the first physical host port with respect to I/O communications between the first physical host port and the first storage system port including:
  - detecting a slow drain condition on an I/O path between the first physical host port and the first storage system port where a first link between the first physical host port and a switch has a first maximum bandwidth which is less than a second maximum bandwidth of a second link between the switch and the first storage system port; and
  - responsive to detecting the slow drain condition, selecting a lower of the first maximum bandwidth and the second maximum bandwidth as the predefined bandwidth threshold for the first physical host port;
- monitoring a cumulative bandwidth consumption rate on the plurality of I/O connections each identifying an I/O connection between the first storage system port of the storage system and one of the plurality of virtual host ports associated with the first physical host port; and
- if the cumulative bandwidth consumption rate on the plurality of I/O connections between the first storage system port and the plurality of virtual host ports which are associated with the first physical host port exceeds the predefined bandwidth threshold of the first physical host port, reducing bandwidth consumption on at least a first of the plurality of I/O connections between the first storage system port of the storage system and a first of the plurality of virtual host ports associated with the first physical host port.

16. The one or more non-transitory computer-readable media of claim 15, wherein said determining the plurality of virtual host ports that are associated with the first physical host port includes:
- determining that respective host port IDs of the plurality of virtual host ports correspond to a same port of a switch that is included in the system and is physically linked to the first physical host port.

17. The non-transitory computer-readable media of claim 16, wherein said determining the plurality of virtual host ports that are associated with the first physical host port includes:
- the storage system sending one or more queries to the switch, each of the one or more queries including an identifier of at least one of the plurality of virtual host ports; and
- the switch sending to the storage system one or more responses to the one or more queries, the one more responses including, for each of the at least one of the plurality of virtual host ports, an identifier of a same SHP physically linked to the first physical host port.

18. The non-transitory computer-readable media of claim 17, wherein each of the one more queries is a GFPN query in accordance with a Fibre Channel protocol.

19. The non-transitory computer-readable media of claim 15, wherein the method further comprises:
- maintaining a data structure including a plurality of entries, each entry representing a physical host port having at least one I/O connection with the physical host port of the host system, wherein the data structure includes a first entry representing the first physical host port and specifying the plurality of I/O connections.

20. The non-transitory computer-readable media of claim 15, wherein the first physical host port has a predefined I/O count threshold, and wherein the method further comprises:
- executable code that monitors a cumulative I/O transmission rate on the one or more I/O connections; and
- if the cumulative I/O transmission rate exceeds the predefined ICT of the first physical host port, adjusting the I/O transmission rate on one or more of the I/O connections.

* * * * *